(12) United States Patent
Matsuno et al.

(10) Patent No.: US 9,944,309 B2
(45) Date of Patent: Apr. 17, 2018

(54) STEERING COLUMN DEVICE

(71) Applicant: FUJI KIKO CO., LTD., Kosai-shi, Shizuoka (JP)

(72) Inventors: Mitsuyoshi Matsuno, Kosai (JP); Koji Sawamura, Kosai (JP); So Tanaka, Kosai (JP); Tadao Ito, Toyohashi (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 15/295,032

(22) Filed: Oct. 17, 2016

(65) Prior Publication Data
US 2017/0113711 A1 Apr. 27, 2017

(30) Foreign Application Priority Data

Oct. 23, 2015 (JP) .................. 2015-208496

(51) Int. Cl.
*B62D 1/19* (2006.01)
(52) U.S. Cl.
CPC ............... *B62D 1/19* (2013.01); *B62D 1/192* (2013.01)
(58) Field of Classification Search
CPC .................................. B62D 1/19; B62D 1/192
See application file for complete search history.

(56) References Cited

U.S. PATENT DOCUMENTS

| 3,699,824 A * | 10/1972 | Staudenmayer | B62D 1/192 74/492 |
| 3,748,922 A * | 7/1973 | Farrell | B62D 1/192 74/492 |
| 3,757,601 A * | 9/1973 | Burke | B62D 1/192 188/129 |
| 3,815,438 A * | 6/1974 | Johnson | B62D 1/192 180/271 |
| 4,006,647 A * | 2/1977 | Oonuma | B62D 1/192 188/371 |
| 4,509,386 A * | 4/1985 | Kimberlin | B62D 1/192 188/371 |
| 4,867,003 A * | 9/1989 | Beauch | B62D 1/192 280/777 |
| 5,737,971 A * | 4/1998 | Riefe | B62D 1/181 280/775 |

(Continued)

FOREIGN PATENT DOCUMENTS

| JP | 2010-018182 A | 1/2010 |
| JP | 2014/101070 A | 6/2014 |

*Primary Examiner* — Drew J Brown
(74) *Attorney, Agent, or Firm* — Foley & Lardner LLP

(57) ABSTRACT

A steering column device has a downward U-shaped attachment bracket, an upward U-shaped lower jacket, a polygonal cylindrical mid jacket 3, a polygonal cylindrical upper jacket 4 inserted into the polygonal cylindrical mid jacket 3 and a shock energy absorbing mechanism 26 to absorb a shock energy at the time of a secondary collision. The shock energy absorbing mechanism 26 has a contracting guide part 27 to perform sliding and contracting operation of the upper jacket 4 to the mid jacket 3 separately from an energy absorbing part 28. The contracting guide part 27 is formed by interposing a plurality of linear guides 29 at an overlapping part between the mid jacket 3 and the upper jacket 4, linear guides 29 in which a plurality of bolls 29*b* arranged in the sliding direction of the mid jacket 3 and the upper jacket 4 are connected to each other through holders 29*a*.

6 Claims, 11 Drawing Sheets

(56) References Cited

U.S. PATENT DOCUMENTS

| | | | | |
|---|---|---|---|---|
| 5,911,438 A * | 6/1999 | Anspaugh | ............... | B62D 1/192 |
| | | | | 280/775 |
| 6,729,648 B2 * | 5/2004 | Ulintz | .................... | B62D 1/192 |
| | | | | 280/777 |
| 2002/0011724 A1 * | 1/2002 | Satou | ..................... | B62D 1/192 |
| | | | | 280/777 |
| 2002/0024210 A1 * | 2/2002 | Nomura | ................. | B62D 1/192 |
| | | | | 280/777 |
| 2014/0137694 A1 | 5/2014 | Sugiura | | |
| 2016/0039450 A1 * | 2/2016 | Johta | ..................... | B62D 1/184 |
| | | | | 74/493 |
| 2017/0113710 A1 * | 4/2017 | Matsuno | ................ | B62D 1/187 |

* cited by examiner

STEERING COLUMN DEVICE

BACKGROUND OF THE INVENTION

The present invention relates to a steering column device which is mounted on a vehicle, and particularly to a steering column device having a function for absorbing shock energy particularly at the time of a secondary collision caused by an occupant.

In this type of the steering column device having the shock energy absorbing function, as is well known, it is possible to perform the relative sliding operation between the outer tube of an upper side and the inner tube of a lower side, which form a steering column. When a predetermined load is exerted on a steering wheel at the time of the secondary collision of the occupant caused by the collision of the vehicle (primary collision), the shock energy is absorbed by performing the relative sliding operation between the outer tube and the inner tube.

On the other hand, a wrench might occur by exerting a load on the steering wheel from a direction other than the axial direction of the steering column at the time of the secondary collision of the occupant by the difference of a condition at the time of the vehicle collision (for example, a full-wrap frontal collision or an offset frontal collision) and the difference of the mounting angle of the steering column to the vehicle. In this case, there is a fear that a predetermined shock energy absorbing performance is not obtained. As a solution to this, for example, a steering column device disclosed in JP Patent Application Publication No. 2014-101070 is proposed.

In the steering column device disclosed in JP Patent Application Publication No. 2014-101070, the steering column device has the outer tube of an upper side and the inner tube of a lower side which relatively slide in the axial direction of the outer tube and the inner tube at the time of the shock absorption with the collision of the vehicle. In addition, a rolling element (sliding resistance reduction element), such as a cylindrical roller, is provided at each end portion of the outer tube and the inner tube. The rolling element provided at the end portion of the outer tube is brought into press-contact with the inner tube, and the rolling element provided at the end portion of the inner tube is brought into press-contact with the outer tube.

Furthermore, although an object is different from that of the steering column device disclosed in JP 2014-101070, JP Patent Application Publication No. 2010-18182 discloses a steering column device in which a rolling element is interposed between the outer tube of an upper side and the inner tube of a lower side, similar to the rolling element disclosed in JP 2014-101070 (see FIG. 14 and FIG. 17 to FIG. 20 of JP 2010-18182).

SUMMARY OF THE INVENTION

However, in the steering column device disclosed in JP 2014-101070, a column jacket (steering column) formed of the outer tube and the inner tube is supported by being fastened to the fastening shaft of a telescopic position adjustment mechanism in an overlapping part between the column bracket fixed to the outer tube and an upper bracket. The improvement of supporting rigidity and bending rigidity is therefore limited.

In addition, even if the effect of sliding resistance reduction can be expected by interposing the rolling element, since the shock energy at the time of the secondary collision is absorbed by only the relative sliding stroke between the outer tube and the inner tube, the reduction of the size of the entire device is limited while shortening the total length of the tubes and the length of the steering column. Moreover, the adjustment or the regulation of the degree of the effect of the sliding resistance reduction by the rolling element becomes difficult.

Furthermore, since an eccentric cam which integrally rotates with the fastening shaft of the telescopic position adjustment mechanism is brought into contact with the inner tube, the sliding resistance between the outer tube and the inner tube fluctuates by the fastening degree of the fastening shaft, and there is therefore a fear that stable shock energy absorbing performance cannot be obtained.

In the steering column device disclosed in JP 2010-18182, a part of a column clamp member integrally formed with the outer tube is formed into a slit, and the column clamp member is supported by being fastened to the fastening shaft of a telescopic position adjustment mechanism. By the existence of the slit, similar to the steering column device disclosed in JP 2014-101070, the improvement of supporting rigidity and bending rigidity is limited.

Furthermore, in the steering column device disclosed in JP 2010-18182, since a position at which the rolling element is placed is at the position of a fastening portion which regulates the relative position between the outer tube and the inner tube except for at the time of the shock energy absorption, when the shock energy is absorbed, it is necessary to separate the rolling element from the fastening portion at the time of the initial operation of the sliding operation between the outer tube and the inner tube, and by the variation of fastening degree, similar to the above, there is therefore a fear that stable shock energy absorbing performance cannot be obtained.

The present invention was made in view of the above technical problem. An object of the present invention is therefore to provide a steering column device which is capable of obtaining stable shock energy absorbing performance in a case where the wrench occurs, while improving the rigidity of the steering column device in a state in which the energy absorbing part and the sliding guide part of an shock energy absorbing mechanism are functionally and structurally independent from each other.

The steering column device of the present invention has a downward U-shaped attachment bracket fixed to the vehicle, an upward U-shaped lower jacket disposed inside the U-shaped space of the attachment bracket and supported by the attachment bracket, a polygonal cylindrical mid jacket disposed inside the U-shaped space of the lower jacket and supported by the lower jacket, a polygonal cylindrical upper jacket, of which a shape is similar to that of the mid jacket, inserted into and supported by the mid jacket so as to be able to slide, and a shock energy absorbing mechanism for absorbing the shock energy at the time of the secondary collision.

Moreover, the shock energy absorbing mechanism has a contracting guide part to perform smooth sliding and contracting operation of the upper jacket to the mid jacket at the time of the secondary collision separately from an energy absorbing part serving as a load generation part to absorb the shock energy. The contracting guide part is formed by interposing a linear motion guide member, in which at least two rolling elements arranged in the sliding direction of the mid jacket and the upper jacket are supported by a holder, at an overlapping part between the mid jacket and the upper jacket. The relative position between the mid jacket and the upper jacket is regulated except for at the time of the collision by a pin member which is sheared at the time of the collision.

In this case, in order to improve the stability of the relative sliding operation between the mid jacket and the upper jacket, as claimed in claim 2, in the overlapping part between the polygonal cylindrical mid jacket and the polygonal cylindrical upper jacket whose shape is similar to that of the mid jacket, it is desirable that the linear motion guide member is interposed between each of the corner parts of the polygonal cylindrical mid jacket and each of the corner parts of the polygonal cylindrical upper jacket.

In addition, in a case where the handleability and the assemblability of the linear motion guide member are considered, as claimed in claim 3, it is desirable that the holders of a plurality of the liner guide members are connected to each other through connection members disposed at a position of the front side of the vehicle more than that of the pin member even when the upper jacket slides into the mid jacket.

Moreover, in a case where the assemblability of the linear motion guide member is considered, as claimed in claim 4, it is desirable that at least the back end portion of each of the linear motion guide members is locked to the back end portion of the mid jacket, and the position of each of the linear motion guide members with respect to the mid jacket is positioned.

Furthermore, in order to improve the further stability of the relative sliding operation between the mid jacket and the upper jacket through the linear motion guide member, and the prevention of the relative rotation therebetween, as claimed in claim 5, it is desirable that a guide groove on which the rolling elements of the linear motion guide member roll is formed on each of the mid jacket and the upper jacket.

Here, although any type of the energy absorbing part of the shock energy absorbing mechanism can be applied, from the point of the view of the size reduction of the entire device, as claimed in claim 6, it is desirable that the mid jacket has the polygonal cylindrical jacket body and the downward U-shaped distance bracket fixed to the upper part of the jacket body, and the energy absorbing part of the shock energy absorbing mechanism is provided inside the U-shaped space of the distance bracket.

According to the present invention according to claim 1, each of the mid jacket and the upper jacket has a polygonal shape, and furthermore, the mid jacket, into which the upper jacket is inserted, is supported so as to be covered from the upper side and the lower side of the mid jacket in a box shape with the downward U-shaped attachment bracket and the upward U-shaped lower jacket. The rigidity of the entire steering column device, that is, the supporting rigidity and the bending rigidity are therefore high, and it is thus remarkably superior in strength.

In addition, the energy absorbing part and the contracting guide part of the shock energy absorbing mechanism are functionally and structurally separated, and the contracting guide part is one in which the linear motion guide members are interposed at the overlapping part between the polygonal cylindrical mid jacket and the polygonal cylindrical upper jacket. With this, even in a case where the wrench occurs to the column jacket at the time of the secondary collision, it is possible to absorb the shock energy by performing the smooth sliding and contracting operation between the mid jacket and the upper jacket, and shock energy absorbing performance therefore becomes extremely stable, regardless of the difference of a condition at the time of the vehicle collision and the difference of the mounting angle of the steering column to the vehicle.

Moreover, the contracting guide part is independent from the energy absorbing part. It is therefore possible to independently set the sliding stroke of the upper jacket to the mid jacket without considering the energy absorbing performance at the energy absorbing part, and the rolling bearing function of the linear motion guide member is exhibited in the contracting guide part. By this, further stable shock energy absorbing performance can be obtained.

According to the present invention according to claim 2, in the overlapping part between the polygonal cylindrical mid jacket and the polygonal cylindrical upper jacket, the linear motion guide member is interposed between each of the corners of the polygonal cylindrical mid jacket and each of the corners of the polygonal cylindrical upper jacket. With this, the relative sliding operation of the upper jacket to the mid jacket is extremely stably performed even if the wrench occurs at the time of the secondary collision as above.

According to the present invention according to claim 3, the holders of the plurality of the linear motion guide members are connected to each other through connecting members disposed at the vehicle front side more than the pin member, and the handling of the linear motion guide member therefore becomes easy, as compared with a case where the plurality of the linear motion guide members are separated and independent from each other. Furthermore, the pin member needs to be sheared for the relative sliding operation between the mid jacket and the upper jacket, the connecting members, however, do not become an obstacle when the pin member is sheared.

According to the present invention according to claim 4, at least the back end portion of the linear motion guide member is locked to the back end portion of the mid jacket and then positioned, and workability at the time when the steering column device is assembled is therefore improved.

According to the present invention according to claim 5, the guide groove on which the rolling elements of each the linear motion guide members roll is provided on each of the mid jacket and the upper jacket, and consequently, the guide effect and the turn preventing effect, which prevents relative rotation of them, of the linear motion guide member become further remarkable. Thus, the relative sliding operation between the mid jacket and the upper jacket becomes more stable, and the prevention of the relative rotation is stably performed.

According to the present invention according to claim 6, the energy absorbing part of the shock energy absorbing mechanism is provided in the U-shaped space of the distance bracket, and thereby the energy absorbing part and the contracting guide part which are functionally and positionally independent from each other can be disposed so as to overlap with each other in the axial direction of the jackets. With this, the size of the steering column device can also be reduced.

BRIEF DESCRIPTION OF THE DRAWINGS

FIG. 11(A) is its enlarged side view. FIG. 11(B) is its right side view.

DETAILED DESCRIPTION OF THE INVENTION

Figure 1:
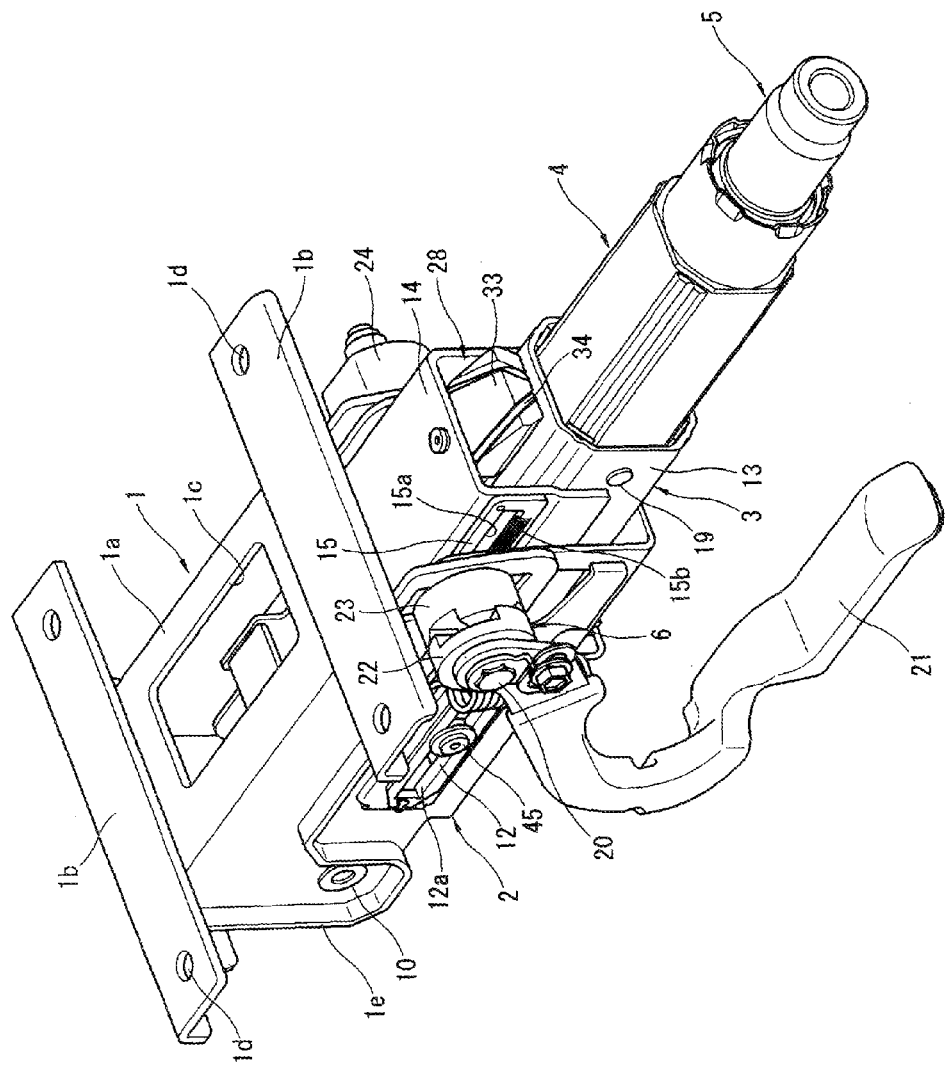
FIG. 1 is a perspective view of a first embodiment of a steering column device according to the present invention.
Figure 2:
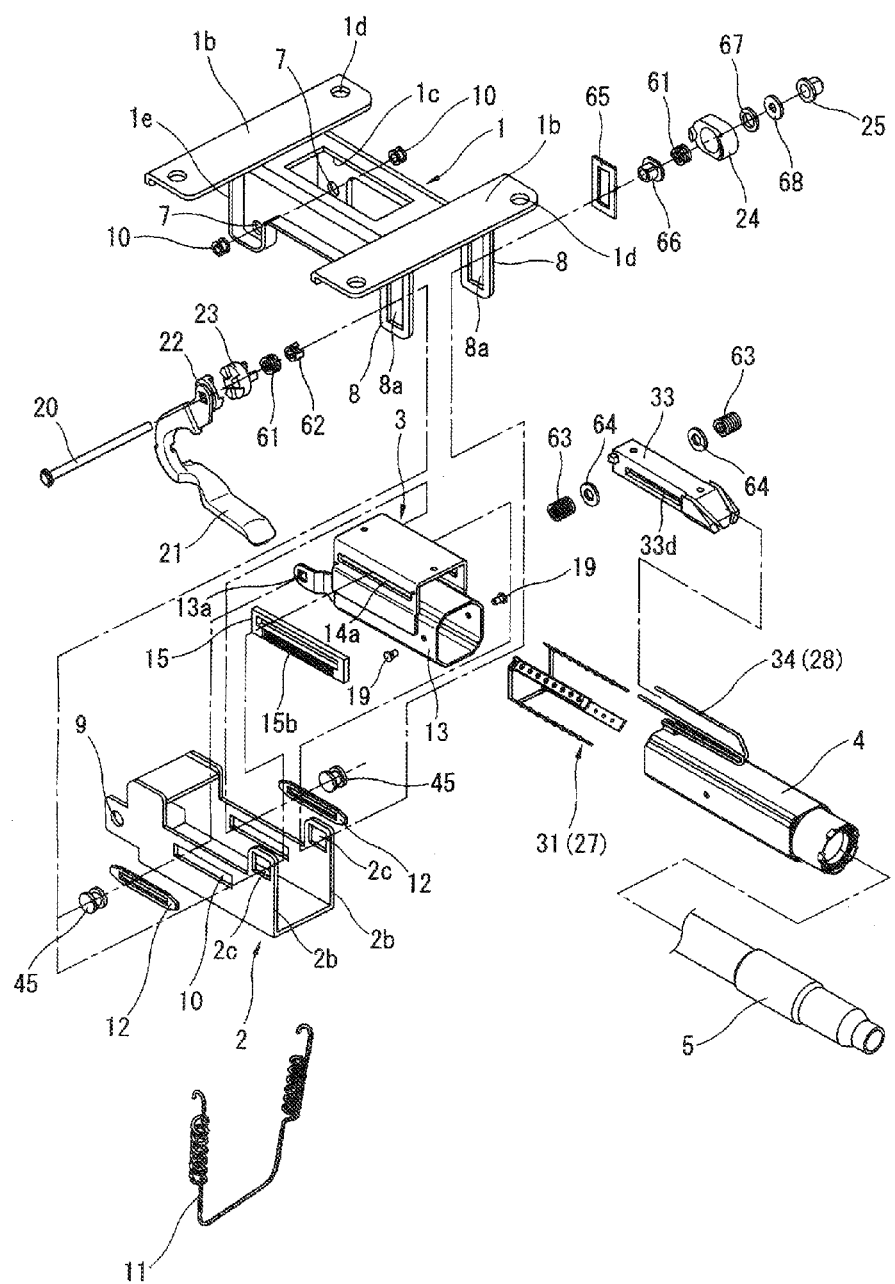
FIG. 2 is a perspective exploded view of main constituent elements in the steering column device shown in FIG. 1.
Figure 3:
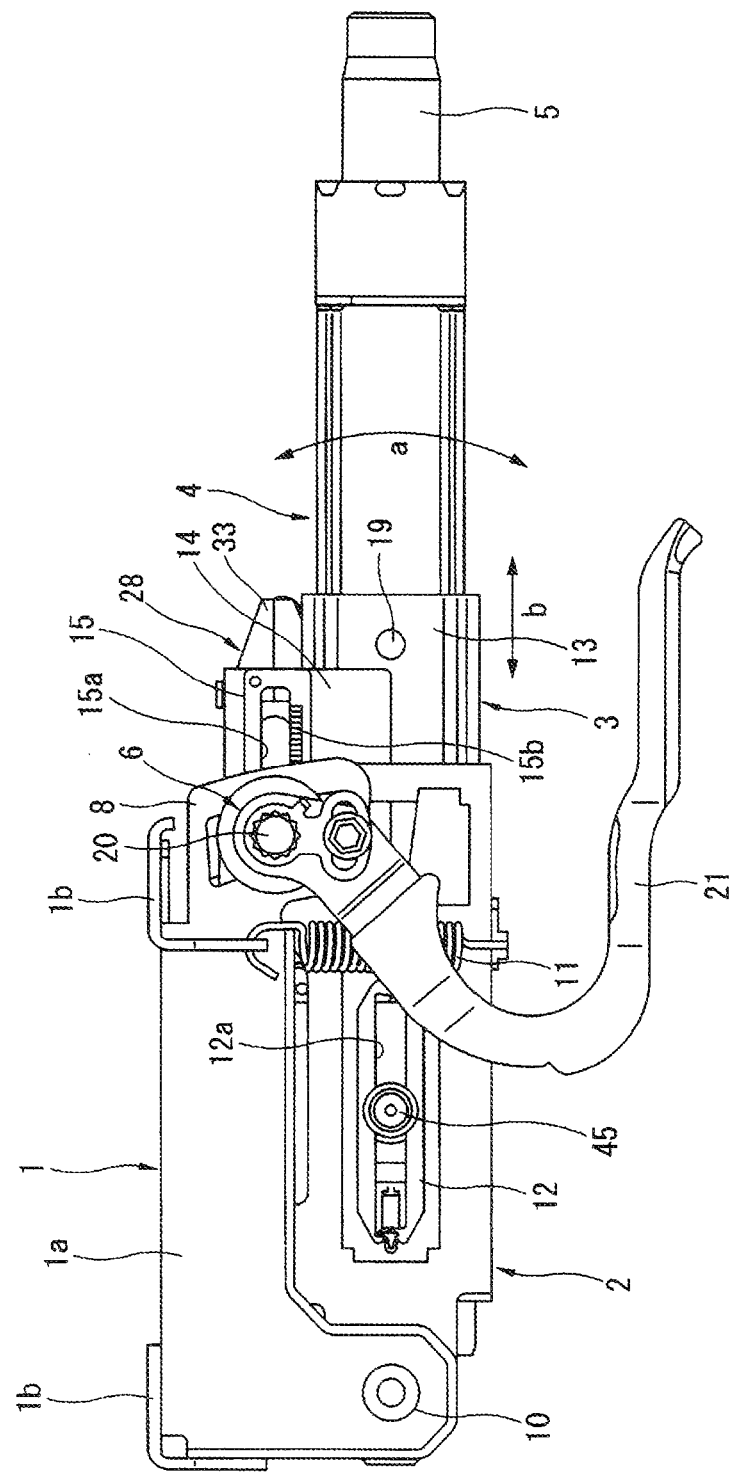
FIG. 3 is a side view of the steering column device shown in FIG. 1.
Figure 4:
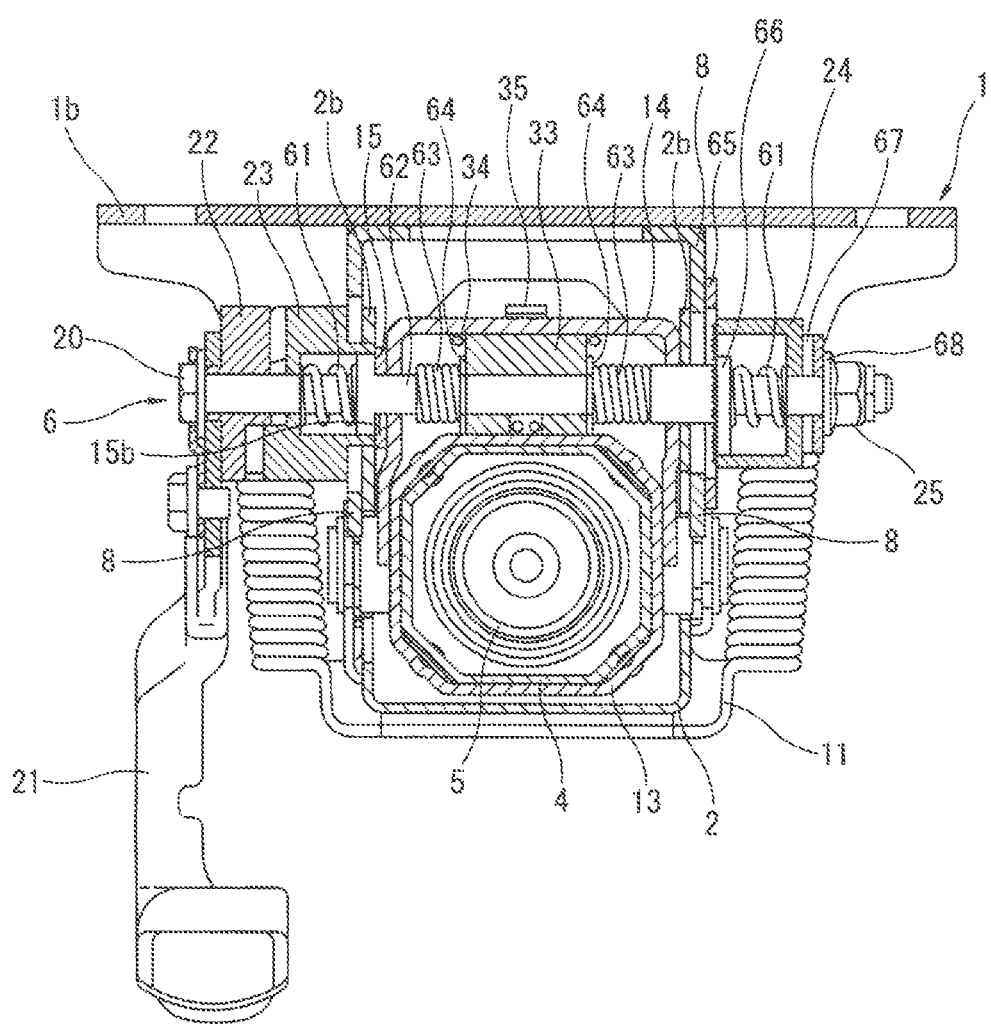
FIG. 4 is explanation of a sectional view in a cross section passing through an operation shaft and orthogonal to the longitudinal direction of the steering column device shown in FIG. 1.
Figure 5:
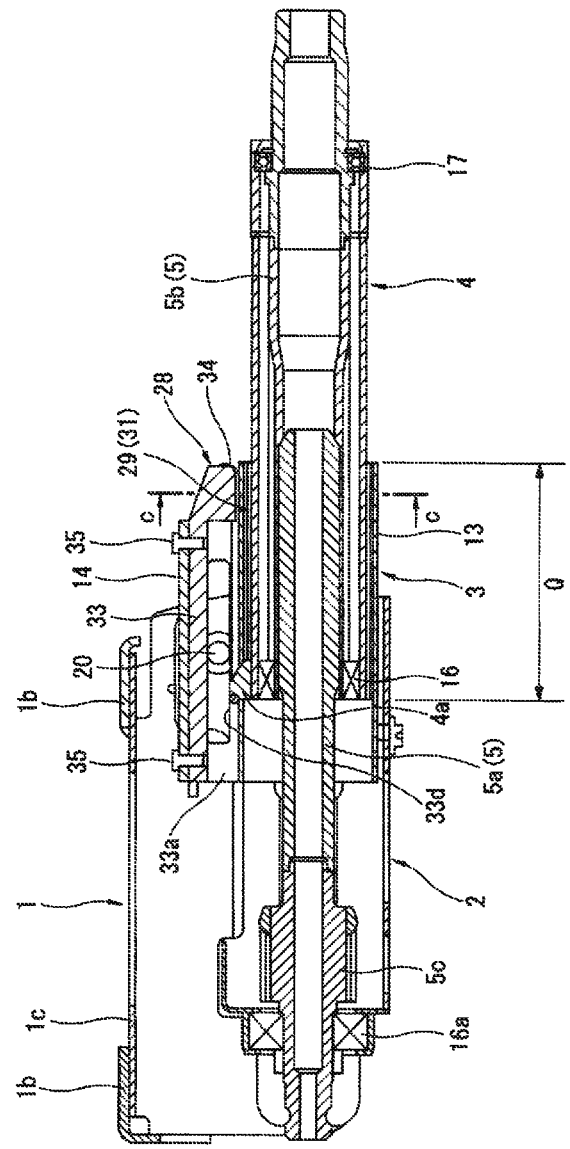
FIG. 5 is a longitudinal sectional view taken along the longitudinal direction of the steering column device shown in FIG. 1.

FIG. 1 to FIG. 8 show a further specific first embodiment of a steering column device according to the present invention. Here, there is shown the first embodiment of the steering column device which is capable of tilt operation and telescopic operation by manual operation. In addition, FIG. 1 shows the perspective view of the entire steering column device. FIG. 2 shows the perspective exploded view of main constituent elements in the steering column device shown in FIG. 1. Furthermore, FIG. 3 and FIG. 4 respectively show the side view and the sectional view of the steering column device shown in FIG. 1. FIG. 5 shows the longitudinal sectional view of the steering column device shown in FIG. 1.

As shown in FIG. 1 and FIG. 2, the steering column device mainly has an attachment bracket 1 which serves as an attachment member to a vehicle which is not shown in the drawings, a lower jacket 2 which is supported so as to be able to swing and operate (tilt position adjustment) in the vertical direction of the vehicle (the arrow "a" direction of FIG. 3) with respect to the attachment bracket 1, a mid jacket 3 which is supported so as to be able to move forward and backward (telescopic positioning adjustment) in the front and back direction of the vehicle (the arrow "b" direction of FIG. 3) with respect to the lower jacket 2, an upper jacket 4 which is inserted into and supported by the mid jacket 3 so as to be able to relatively slide in the axial center direction of the mid jacket 3, a steering shaft 5 which is inserted into and rotatably supported by the upper jacket 4, and a lock mechanism 6 for press-fastening and unlocking the attachment bracket 1, the lower jacket 2 and the mid jacket 3 for the tilt position adjustment and the telescopic position adjustment. In addition, the boss portion of a steering wheel which is not shown in the drawings, is serration-connected to the back end portion of the steering shaft 5.

As shown in FIG. 1 and FIG. 2, the attachment bracket 1 has a downward U-shaped main body 1a whose under surface opens, and a pair of front and back plate-shaped stays 1b which is fixed to the upper surface of the main body 1a. In addition, the middle part of the upper surface of the main body 1a also opens as an opening portion 1c. Moreover, the attachment bracket 1 is fixed to the vehicle by bolts which are inserted into mounting holes 1d formed on each of the stays 1b. In addition, a reinforcement rib 1e vertically projects from each of side wall portions of the main body 1a so as to fringe the lower sides of both of the side wall portions.

As shown in FIG. 2, a shaft hole 7 is formed through each of the front end portions of the side wall portions in the main body 1a, and a clamp piece 8 is extended from and formed at each of the back end portions of the side wall portions. As is clear from FIG. 3, the pair of the clamp pieces 8 is separated from the stay 1b positioned above the pair of the clamp pieces 8 and from the upper surface of the main body 1a, and thereby the pair of the clamp pieces 8 are formed so as to be able to elastically deform in an approaching direction to and a separating direction from each other within a range of a self-elastic force. Furthermore, a circular arc-shaped long hole 8a is formed in each of the clamp pieces 8, and, as mentioned below, the tilt position can be adjusted within a range of the long hole 8a.

The lower jacket 2 shown in FIG. 2 has an upward U-shape whose upper surface opens, and the only front end portion of the lower jacket 2 is formed into a box shape by providing an end plate 2a. A shaft hole 9 is formed at each of the front end extended portions of both of the side wall portions of the lower jacket 2. In addition, a long hole 10 used for adjusting the telescopic position is formed at each of the middle parts of both of the side wall portions of the lower jacket 2 along the front and back direction. Moreover, a pair of fastening pieces 2b extending upwards is formed at the back end portions of both of the side wall portions.

As shown in FIG. 4, the lower jacket 2 is assemble so as to be accommodated in the U-shaped space of the attachment bracket 1. At that time, the shaft hole 9 of the lower jacket 2 and the shaft hole 7 of the attachment bracket 1 are matched, and hinge pins 10 are inserted into the holes and fixed by being riveted. With this, the lower jacket 2 is supported so as to be able to swing with the hinge pin 10 as a fulcrum, that is, it is supported by the attachment bracket 1 so as to be able to adjust the tilt position. In addition, as mentioned above, the upward U-shaped lower jacket 2 is assembled so as to be accommodated in the U-shaped space of the downward U-shaped attachment bracket 1. The overlapping part between the lower jacket 2 and the attachment bracket 1 thus has a substantially box-shaped (box-like) sectional shape.

A return spring 11 that is a tension coil spring type is set so as to surround the lower jacket 2. As shown in FIG. 3, the hook portions of both of the upper end portions of the return spring 1 are respectively engaged with engaging holes formed through the stay 1b provided at the back side of the attachment bracket 1. With this, the lower jacket 2 supported so as to be able to adjust the tilt position with respect to the attachment bracket 1 is urged upwards, that is, it is urged in a counterclockwise direction in FIG. 3 with the hinge pin 10 as the fulcrum.

As shown in FIG. 2, a sliding guide 12 having a long hole 12a (see FIG. 1 and FIG. 3) is fitted and supported on each of the long holes 10 formed in the lower jacket 2 to adjust the telescopic position so as to fit to each of the long holes 10 from the outside. The after-mentioned joint fastening pin 45 penetrates through each of those long holes 10 and 12a of each of the side wall portions of the lower jacket 2 so as to be able to slide. The sliding guide 12 is made of, for example, a resin material whose friction coefficient is low.

The fastening pieces 2b respectively formed at the back end portions of the side wall portions of the lower jacket 2 are formed so as to be able to elastically deform in an approaching direction to and a separating direction from each other within a range of a self-elastic force. A square or a rectangular shaft hole 2c is formed through each of these fastening pieces 2b.

The mid jacket 3 shown in FIG. 1 and FIG. 2 has the after-mentioned quadrangular or deformed octagonal cylindrical jacket body 13, a distance bracket 14 fixed to the upper surface of the jacket body 13, and a pair of sliding contact pieces 13a extending from the front end portions of both of the side wall portions of the jacket body 13.

The distance bracket 14 has a downward U-shape whose lower surface opens, and its lower end portions are fitted to the jacket body 13 so as to straddle the jacket body 13 and fixed to the jacket body 13 by welding. As to the mid jacket 3, the jacket body 13 has a cylindrical quadrangular shape or a cylindrical deformed octagonal shape, and in addition to this jacket body 13, the mid jacket 3 has a box-shaped sectional shape formed by covering the jacket body 13 with the distance bracket 14 to the approximately center position (a position overlapping with the horizontal line of a column center) of the side surface of the jacket body 13, and is brought into slidably contact with the inner side surface of the lower jacket 2. Each long hole 14a used for adjusting the telescopic position is formed at both of the side wall portions of the distance bracket 14 along the front and back direction.

Furthermore, as shown in FIG. 2, a concave surface which is recessed from a surface contacting the inner side surface of the lower jacket 2 is formed at one of the side wall portions of the distance bracket 14. A tooth plate 15 having a long hole 15a (see FIG. 1 and FIG. 3) overlapping with the long hole 14a is fixed to the outer side of the concave surface.

Here, as shown in FIG. 1 and FIG. 3, as to the tooth plate 15 fixed to the one of the side wall portions of the distance bracket 14, a tooth surface 15b such as a rack is formed at one of the edges of the long hole 15a along the longitudinal direction with the long hole 15a so as to be lower than the surface of the tooth plate 15. In a state in which the distance bracket 14 has been assembled inside the lower jacket 2, the inner side surface of one of the fastening pieces 2b of the lower jacket 2, inner side surface which faces the tooth plate 15, does not therefore contact the tooth surface 15b. Thus, as mentioned below, the distance bracket 14 of the mid jacket 3 is press-fastened with the U-shaped attachment bracket 1 and the U-shaped lower jacket 2.

As shown in FIG. 2, the pair of the sliding contact pieces 13a, 13a extending from the front end of the jacket body 13 is formed so as to be able to elastically deform within a range of a self-elastic force in an approaching direction to and a separating direction from each other. A shaft hole is formed through each of the sliding contact pieces 13a.

In a state in which the mid jacket 3 has been assembled inside the U-shaped space of the upward U-shaped lower jacket 2 as above, the shaft hole formed through each of the pair of the sliding contact pieces 13a is positioned so as to overlap with the long hole 10 of the lower jacket 2 and with the long hole 12a of the sliding guide 12, and the joint fastening pin 45 is inserted into these holes 10 and 12a and riveted. By this, the sliding contact piece 13a of the mid jacket 3 is connected so as to be able to slide along the long hole 10 (including the long hole 12a of the sliding guide 12) of the lower jacket 2. As this result, the mid jacket 3 is supported so as to be able to slide in the axial center direction of the mid jacket 3 with respect to the lower jacket 2.

The upper jacket 4 shown in FIG. 1 and FIG. 2 has a cylindrical quadrangular shape or a cylindrical deformed octagonal shape of the similar shape to the jacket body 13 of the mid jacket 3, and is inserted into the jacket body 13 so as to be able to slide. Furthermore, as shown in FIG. 5, an upper shaft 5b is supported by the upper jacket 4 so as to be able to rotate through bearings 16 and 17, and a lower shaft 5a is fitted to the upper shaft 5b by serration-fitting so as to be able to slide in the axial direction and integrally rotate with the upper shaft 5b. In addition, the tip end portion of the lower shaft 5a is supported by the lower jacket 2 through bearings 16, and has key lock collar attachment portions 5c. The tip end portion of the lower shaft 5a is connected to a steering gear through a universal joint and the other shaft member which are not shown in the drawings.

Figure 6:
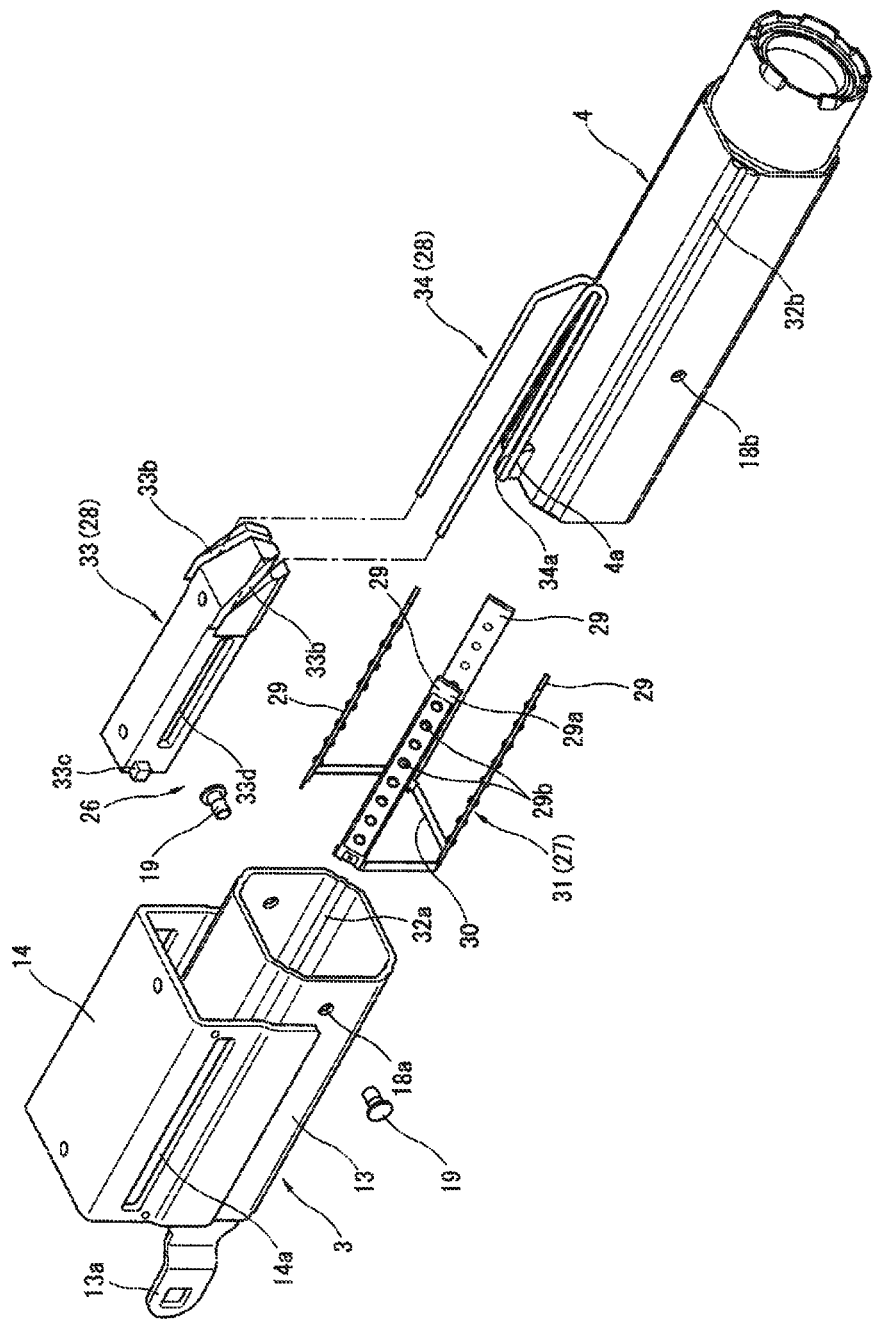
FIG. 6 is a perspective exploded view of constituent elements configuring a shock energy absorbing mechanism in the steering column device shown in FIG. 1.

In addition to the after-mentioned FIG. 6, as shown in FIG. 1 and FIG. 3, the relative position between the jacket body 13 of the mid jacket 3 and the upper jacket 4 is positioned in the axial center direction, and shear pins 19 (shearing pin) made of, for example, resin as a pin member which can be sheared are press-inserted through pin holes 18a and 18b respectively formed at the side wall portions of the jacket body 13 and the upper jacket 4. With this, the jacket body 13 of the mid jacket 3 and the upper jacket 4 are fixed. The function of the shear pin 19 is to connect the jacket body 13 of the mid jacket 3 and the upper jacket 4 so as to prevent the relative sliding operation between the jacket body 13 of the mid jacket 3 and the upper jacket 4 in a normal time, and the shear pin 19 is, however, sheared in a case where a predetermined load is exerted on the upper jacket 4 at the time of the vehicle collision. Consequently, the relative sliding operation of the upper jacket 4 to the jacket body 13 of the mid jacket 3 is permitted.

The lock mechanism 6 shown in FIG. 2 has a bolt-shaped operation shaft 20, an operation lever 21, a ring-shaped movable cam member 22 and a fixed cam member 23. In a state in which the mid jacket 3 and the lower jacket 2 have been assembled and accommodated in the U-shaped space of the downward U-shaped attachment bracket 1, the operation shaft 20 is inserted through the operation lever 21, the movable cam member 22, the fixed cam member 23, a lock spring 61 and a lock member 62, and further through the long hole 8a formed at each of the clamp pieces 8 of the attachment bracket 1, the shaft hole 2c formed at each of the fastening pieces 2b of the lower jacket 2, the long holes 14a (including the long hole 15a of the tooth plate 15) of the distance bracket 14 and a long hole 33d of a block 33 fixed to the inside of the distance bracket 14. As shown in FIG. 4, the lock member 62 penetrates the long hole 8a, the shaft hole 2c, the long hole 14a and the long hole 15a, and has a lock tooth which is capable of meshing with the tooth surface 15b of the tooth plate 15.

In addition, the head part of the operation shaft 20, the operation lever 21, the movable cam member 22 and the fixed cam member 23 are positioned at the outside of one of the clamp pieces 8, and a lock member 66, the lock spring 61, a receiving piece 24, a thrust bearing 67 and a washer 68 are fastened to the tip end portion of the operation shaft 20, which projects to the outside of the other of the clamp pieces 8, by a nut 25, thereby preventing the operation shaft 20 from being pulled out.

The operation shaft 20 is inserted into and fixed to the operation lever 21 and the movable cam member 22 so as to be able to integrally rotate with them, and inserted into the fixed cam member 23 so as to be able to relatively rotate to the fixed cam member 23. In addition, the fixed cam member 23 is fitted to the long hole 8a of one of the clamp pieces 8 so as not to be able to rotate, and the receiving piece 24 is fitted to the other of the clamp pieces 8 also so as not to be able to rotate. A tilt tooth plate 65 is fixed to the outer side of the other of the clamp pieces 8. The tilt tooth plate 65 has a long hole which overlaps with the long hole 8a, and the lock tooth of the lock member 66 is provided so as to be able to mesh with a tooth surface formed along at least one edge of this long hole. With this, when the operation lever 21 is rotatably operated, the operation lever 21, the operation shaft 20 and the movable cam member 22 integrally rotate, and the movable cam member 22 relatively rotates with respect to the fixed cam member 23. In addition, a cam surface is formed on each of the surfaces of the movable cam member 22 and the fixed cam member 23, surfaces which face and are brought into press-contact with each other. Mountain parts and valley parts are alternately arranged in a concave-convex shape on each of the cam surfaces, and these mountain parts and the valley parts formed on each of the surfaces are connected to each other by an inclined surface. Each release spring 63 is disposed between the side surface of the lock member 62 and the side surface of the block 33, and between the side surface of the lock member 66 and the side surface of the block 33 through a washer 64 disposed on the block 33 side. The spring force of this release spring 63 is set lower than that of the lock spring 61.

Here, the main feature of the present invention is a mechanism for absorbing the shock energy at the time of the vehicle collision. However, before explaining the shock energy absorbing mechanism, the tilt position adjustment operation and the telescopic position adjustment operation in the steering column device based on the above explanation is explained.

As shown in FIG. 1, in a state in which the operation lever 21 has been rotatably operated upwards and the mountain parts of the cam surface of the movable cam member 22 and the mountain parts of the cam surface of the fixed cam member 23 have overlapped with and run on each other, a tilt position adjustment function and a telescopic position adjustment function are in a locked state.

That is, by overlapping the mountain parts of the cam surface of the movable cam member 22 with the mountain parts of the cam surface of the fixed cam member 23, the operation shaft 20 is pulled to the head part side in its axial center direction and the distance between the fixed cam member 23 and the receiving piece 24 becomes narrow, and thereby the pair of the clamp pieces 8 of the attachment bracket 1, which is disposed at the outermost position in the axial center direction, the pair of the fastening pieces 2b positioned at the inner side thereof, and the distance bracket 14 of the mid jacket 3 are press-fastened in the axial center direction of the operation shaft 20. At the same time, the lock tooth of the telescopic lock member 62 meshes with the tooth surface 15b of the tooth plate 15, which is provided at the one of the side surfaces of the distance bracket 14, and the lock tooth of the tilt lock member 66 meshes with the tooth surface of the tilt tooth plate 65, which is formed at the outer side of the other of the clamp pieces 8.

Here, even in a case where the tooth tips of the lock tooth of the lock member 62 and the tooth surface of the tooth plate 15, and the tooth tips of the lock tooth of the lock member 66 and the tooth surface of the tooth plate 65 are connected to each other, that is, in a tooth tip locked state, it is possible to lock the tilt position adjustment function and the telescopic position adjustment function without affecting the press-fastening by elastically deforming the lock spring 61.

By this, the lower jacket 2 is locked with respect to the attachment bracket 1 so as not to be able to adjust the tilt position, and the mid jacket 3 is locked with respect to the lower jacket 2 so as not to be able to adjust the telescopic position. Thus, the steering column device self-holds the states of FIG. 1 and FIG. 3, and thereby steering operation by the steering wheel becomes possible.

On the other hand, when the tilt position is adjusted (position adjustment in the vertical direction of the vehicle) or the telescopic position is adjusted (position adjustment in the front-back direction of the vehicle), the operation lever 21 of FIG. 1 is rotatably operated downwards by a predetermined amount. By rotatably operating this operation lever 21 downwards, the mountain parts of the cam surface of the movable cam member 22 drop down to the valley parts of the cam surface of the fixed cam member 23, the pulling force of the shaft of the operation shaft 20 is relaxed, and the press-fastening force acting on the clamp pieces 8 of the attachment bracket 1, etc. is released, and then the tilt position adjustment function and the telescopic position adjustment function become in unlocked states. In the unlocked states, a state in which the lock members 62 and 66 have been relatively separated from the tooth plates 15 and 65 by each of the release springs 63 is maintained.

In the unlocked state, by operating and swinging the lower jacket 2 in the vertical direction of the vehicle (arrow "a" direction in FIG. 3) with respect to the attachment bracket 1 with the hinge pins 10 as a swing center, it is possible to adjust the position of the lower jacket 2, the mid jacket 3 and the upper jacket 4 which are integrated with each other, and thereby becoming possible to adjust the tilt position (position adjustment in the vertical direction of the vehicle) within a range of the long hole 8a formed at the pair of the clamp pieces 8 of the attachment bracket 1.

In addition, in the unlocked state, by moving the upper jacket 4 back and front in the front and back direction of the vehicle ("b" direction in FIG. 3) with the mid jacket 3, it is possible to adjust the telescopic position (position adjustment in the front and back direction of the vehicle) within a range of the long hole 10 of the lower jacket 2 and the sliding guide 12. In this case, the operation shaft 20 is also inserted into the long hole 14a formed at the distance bracket 14 of the mid jacket 3, and the operation shaft 20 does not, therefore, affect the telescopic position adjustment.

In this way, after adjusting the tilt position or the telescopic position, when the operation lever 21 is rotatably operated upwards to the position shown in FIG. 1 again, the unlocked state is returned to the locked state.

In the steering column device which is capable of realizing the above tilt position adjustment function and the telescopic position adjustment function, by jointly fastening the side wall portion of the lower jacket 2 to the sliding contact piece 13a that is a part of the side wall portion of the mid jacket 3 by the joint fastening pin 45, not only in a part where the fastening piece 2b of the lower jacket 2 contacts the distance bracket 14 by receiving the press-fastening force of the lock mechanism 6, but also in a part where the side wall portion of the lower jacket 2 contacts the sliding contact piece 13a of the mid jacket 3 by the joint fastening force of the joint fastening pin 45, the lower jacket 2 holds the mid jacket 3, and the bending rigidity of the entire steering column in the vertical direction and in a right and left direction therefore becomes high, in addition to the supporting rigidity of the entire steering column.

In addition, each of the shape of the jacket body 13 of the mid jacket 3 and the upper jacket 4 which is inserted into the jacket body 13 is the cylindrical quadrangle or the cylindrical deformed octagon. Furthermore, by supporting the upward U-shaped lower jacket 2 so as to be accommodated in the U-shaped space of the downward U-shaped attachment bracket 1, a box-shaped (box-like) closed section is formed, and consequently, in addition to the supporting rigidity of the entire steering column, the bending rigidity in the vertical direction and the right and left direction also becomes high.

Moreover, as described above, the sliding contact piece 13a of the mid jacket 3 is brought into contact with the inner surface of the side wall portion of the lower jacket 2 so as to be able to slide and these are jointly fastened by the joint fastening pin 45. With this, it is possible to suppress wobbling and shakiness at the front end of the jacket body 13 in the mid jacket 3 by the self-elastic force of the sliding contact piece 13a.

Next, the shock energy absorbing mechanism in the above steering column device is explained with reference to mainly FIG. 6 to FIG. 8, and FIG. 1 to FIG. 5, if necessary.

A shock energy absorbing mechanism 26 in the steering column device shown in FIG. 6 has a contracting guide part 27 which permits the smooth contracting operation between the jacket body 13 and the upper jacket 4 based on the sliding operation of the upper jacket 4 to the jacket body 13 of the mid jacket 3, when a collision load is inputted, and an energy absorbing part 28 which serves as a load generation part which generates a load to resist the input load so as to absorb the input load based on the contracting operation of the upper jacket 4 to the jacket body 13.

FIG. 6 is an exploded view in which only the constituent elements of the shock energy absorbing mechanism 26 are extracted. As mentioned below, the shape of the jacket body 13 of the mid jacket 3 is similar to that of the upper jacket 4 and each of them has the cylindrical quadrangular shape or the cylindrical deformed octagonal shape. As mentioned above, the upper jacket 4 is inserted into the jacket body 13 so as to be able to slide the upper jacket 4 with respect to the jacket body 13, and they are connected by the shear pins 19 which can be sheared and which are inserted into the pin holes 18a and 18b respectively formed at the side wall portions of the jacket body 13 and the upper jacket 4. The jacket body 13 of the mid jacket 3 and the upper jacket 4 thus overlap with each other with a predetermined overlap length Q shown in FIG. 5 in a connected state by the shear pins 19.

Moreover, as shown in FIG. 6, a plurality of linear guides 29 as a linear motion guide member are placed between the jacket body 13 of the mid jacket 3 and the upper jacket 4. A linear ball bearing type of the linear guide 29 in which a plurality of balls (steel ball) as a rolling element are arranged in the longitudinal direction in and supported by a thin bar-shaped holder 29a is formed as the linear motion guide member. Furthermore, there is unitized as a linear guide unit 31 by connecting the front end portions of the four linear guides 29 to thin plate-shaped stays 30 as a connecting member so as not to be separated. This linear guide unit 31 has a length corresponding to the overlap length Q between the jacket body 13 of the mid jacket 3 and the upper jacket 4 shown in FIG. 5. As is clear from FIG. 7 corresponding to a sectional view taken along a line C-C in FIG. 5, the linear guide unit 31 is positioned in a space G formed between the jacket body 13 and the upper jacket 4.

Figure 7:
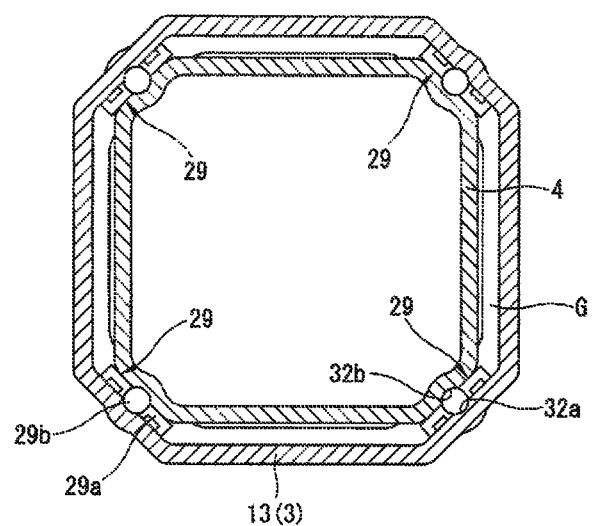
FIG. 7 is an enlarged sectional view corresponding to a sectional view taken along a line C-C in FIG. 5.

More specifically, as shown in FIG. 7, in a case where the sectional surfaces of the jacket body 13 of the mid jacket 3 and the upper jacket 4 which is inserted into the jacket body 13 are quadrangular cylindrical bodies, and the four corners (corner part) of each of the quadrangular cylindrical bodies are C-chamfered, these are formed into the cylindrical structures of the deformed octagons, and the octagon is different in the length of adjacent sides. The octagon has long side parts and short side parts that are alternately formed. The length of the short side part is much shorter than that of the long side part. In addition, the linear guide unit 31 that is the assembly of the four liner guides 29 is placed between the jacket body 13 and the upper jacket 4 so that the linear guide 29 is positioned between each of the short side parts of the jacket body 13 and each of the short side parts of the upper jacket 4 corresponding to the short side part of the jacket body 13 in the space G formed between the jacket body 13 and the upper jacket 4. In addition, in a case where the sectional surfaces of the jacket body 13 of the mid jacket 3 and the upper jacket 4 inserted into the jacket body 13 are quadrangular cylindrical bodies, the linear guide 29 is interposed at each of the four corners (corner part) of the overlapping part where they overlap with each other.

Here, as is clear from FIG. 7, an arc-shaped guide groove 32a is formed on each of the inner side surfaces of the short side parts of the jacket body 13 along the longitudinal direction of the jacket body 13. In addition, an arc-shaped guide groove 32b is formed on each of the outer sides of the short side parts of the upper jacket 4 also along the longitudinal direction so as to respectively face the guide grooves 32a of the jacket body 13. Balls 29b of each of the linear guides 29 are seating on each of the guide grooves 32a and 32b. These guide grooves 32a and 32b serve as a raceway groove of the ball 29b. When the contracting operation of the upper jacket 4 to the jacket body 13 of the mid jacket 3 is performed, the balls 29b of each of the linear guides 29 roll with an extremely low friction coefficient along each of the guides 32a and 32b.

As is clear from the above explanation, the contracting guide part 27 of the shock energy absorbing mechanism 26, contracting guide part 27 which permits the smooth contracting operation between the jacket body 13 of the mid jacket 3 and the upper jacket 4 based on the sliding operation of the upper jacket 4 to the jacket body 13 of the mid jacket 3, is formed of the guide grooves 32a of the jacket body 13, the guide grooves 32b of the upper jacket 4 and the linear guide unit 31 which is the assembly of the four linear guides 29.

On the other hand, as shown in FIG. 1, FIG. 3 and FIG. 5, the energy absorbing part 28 of the shock energy absorbing mechanism 26 is accommodated in the box-shaped space formed between the upper surface of the jacket body 13 of the mid jacket 3 and the distance bracket 14. As shown in FIG. 6, the energy absorbing part 28 is formed of the resistance block 33 as a resistance member and a wire 34 which is wound on the resistance block 33.

As shown in FIG. 3, the total length of the resistance block 33 is approximately the same as that of the distance bracket 14, and the resistance block 33 is inserted into the box-shaped space so that a part of the resistance block 33 projects from the back end portion to the back side of the distance bracket 14. In addition, the resistance block 33 is fixed to the distance bracket 14 by a pair of front and back screws 35.

In addition, as shown in FIG. 6, the width of the back end portion of the resistance block 33 projecting from the back end portion to the back side of the distance bracket 14 is wider than that of the other general portion of the resistance block 33, and the back end portion has a substantially shuttlecock shape which is formed into a tapered shape which gradually tapers off to the back side. As shown in FIG. 5, the lower half other than the back end portion of the resistance block 33 is slit and formed into a slitting groove 33a, and a pair of wire guide grooves 33b is formed into a substantially V shape and is formed over the back end portion of the resistance block 33 from the under surface to the upper surface of the back end portion of the resistance block 33. Moreover, engagement guide portions 33c projecting from both of the side surfaces of the resistance block 33 are formed at the front end portion of the resistance block 33.

The resistance block 33 is inserted into and positioned in the box-shaped space of the distance block 14, and the long hole 33d is therefore formed at a position overlapping with the long hole 14a (including the long hole 15a of the tooth plate 15 shown in FIG. 2) formed at the side wall portion of the distance block 14 so as not to obstruct the function of the long hole 14a, and as shown in FIG. 3 and FIG. 5, the operation shaft 20 of the above-mentioned lock mechanism 6, as a result, penetrates the long hole 33d formed at the resistance block 33 in the width direction of the vehicle.

The wire 34 forming the energy absorbing part 28 with the resistance block 33 is made of, for example, a single piano wire or other single tough metal wires having a circular section. As shown in FIG. 6, the wire 34 is bent in two at a position where the total length of the wire 34 is bisected. That is, the wire 34 has a pine needle shape. A bent base 34a of the wire 34 as a fixing portion to the upper jacket 4 is seized to a hook portion 4a projecting from the tip end upper surface of the upper jacket 4. In addition, the wire 34 is bent to return at a middle part between the bent base 34a and both of the ends of the bent wire 34, and wound on the resistance member.

In more detail, the bent base 34a of the wire 34 bent in two is seized to the hook portion 4a, the end portions of the free end portions of the wire 34 are pulled out toward the back side of the upper jacket 4 so as to be along the under surface of the resistance block 33, and are wound upwards and returned so as to be along the wire guide grooves 33b in the back end portion of the resistance block 33. Furthermore, the end portions of both of the free end portions of the wire 34 are led out to the tip end side of the resistance block 33 while guiding them to the engagement guide portions 33c along both of the side surfaces of the general portions and the inner side surface of the upper surface of the distance bracket 14.

In addition, the operation shaft 20 of the lock mechanism 6 is inserted through the long hole 33d formed at the resistance block 33, and the wire 34 wound onto the resistance block 33 is, as a result, wired on and under the operation shaft 20.

Moreover, the wire guide groove 33b is inclined so as to have a substantially V shape, and therefore it is possible to make a larger curvature of the wire guide groove 33b than that of an arc with a distance as a diameter in the vertical direction between the distance bracket 14 and the jacket body 13. With this, it becomes possible to set the curvature of the wire guide groove 33b required for energy absorption without increasing the distance in the vertical direction between the distance bracket 14 and the jacket body 13, and the size of the distance bracket 14 can thus be reduced.

In this way, in the steering column device of the present embodiment, in the shock energy absorbing mechanism 26 shown in FIG. 6, the contracting guide part 27 which permits the smooth contracting operation between the jacket body 13 and the upper jacket 4 based on the sliding operation of the upper jacket 4 to the jacket body 13 of the mid jacket 3 when the collision load is inputted, and the energy absorbing part 28 serving as a load generation part which generates the load to resist the input load so as to absorb the input load based on the contracting operation of the jacket body 13 and the upper jacket 4 are functionally separated, and the contracting guide part 27 and the energy absorbing part 28 are disposed at positions separately.

Therefore, according to the shock energy absorbing mechanism 26 of the steering column device in the present embodiment, the state of FIG. 1, FIG. 3, and FIG. 5 is self-held at the normal time in an mounted state, and in addition to the steering operation by the steering wheel, the above-mentioned tilt position adjustment and telescopic position adjustment become possible.

On the other hand, when a load larger than a set load is exerted on the upper jacket 4 through the steering shaft 5 at the time of the secondary collision of an occupant caused by the vehicle collision, the shear pin 19 of FIG. 6 fixing the jacket body 13 of the mid jacket 3 and the upper jacket 4 is sheared, and the sliding operation of the upper jacket 4 to the jacket body 13 is permitted by the function of the contracting guide part 27 having the linear guide unit 31 as a main element.

With this sliding operation, the upper jacket 4 smoothly slides to the jacket body 13 through the linear guide unit 31 positioned therebetween, and the smooth contracting operation of the upper jacket 4 to the jacket body 13 is performed with the low friction coefficient. As shown in FIG. 6 and FIG. 7, the stability of this contracting operation is maintained by rolling the bolls 29b of each of the linear guides 29 forming the linear guide unit 31 along each of the guide grooves 32a of the jacket body 13 and each of the guide grooves 32b of the upper jacket 4. The stability of the contracting operation can be also maintained even if the wrench as a load to a column jacket occurs at the time of the secondary collision.

When the contracting operation between the jacket body 13 and the upper jacket 4 is performed, at the same time of this, the energy absorbing part 28 having the resistance block 33 and the wire 34 as a main element functions. That is, as shown in FIG. 6, when the contracting operation between the jacket body 13 and the upper jacket 4 is performed, the wire 34 seized to the tip end portion of upper jacket 4 in a state of being folded in two is pulled to the front side of the vehicle. In this case, since the wire 34 pulled toward the vehicle front side is, as shown in FIG. 6, folded at the back end portion of the resistance block 33 fixed to the resistance bracket 14 and wound on the wire guide grooves 33b having a predetermined radius, the wire 34 is gradually pulled out from the wire guide grooves 33b of the back end portion of the resistance block 33 while receiving squeezing resistance.

In more detail, in a part where the wire 34 is wound around the back end portion of the resistance block 33, the wire 34 pulled out to the vehicle front direction side by the contracting operation of the upper jacket 4 to the jacket body 13 of the mid jacket 3 is curled by the relative sliding of the upper jacket 4 to the jacket body 13, and thus receiving the squeezing resistance. When the curled wire 34 reaches the underside part of the resistance block 33, the curled wire 34 is corrected so as to be in a straight state, and the corrected wire 34 is pulled out to the vehicle front direction side by the sliding of the upper jacket 4.

Therefore, even if the sliding operation between the jacket body 13 of the mid jacket 3 and the upper jacket 4 is possible with the low fiction coefficient by positioning the linear guide unit 31, which is the main element of the contracting guide part 27, between the jacket body 13 and the upper jacket 4, a load resisting the input load is generated by the squeezing resistance based on a relative sliding between the resistance block 33 of the energy absorbing part 28 and the wire 34 so as to absorb the input load based on the contracting operation between the jacket body 13 and the upper jacket 4. With this, it becomes possible to effectively and stably absorb the shock energy at the time of the secondary collision of the occupant caused by the vehicle collision without being affected by the sliding resistance between the jacket body 13 of the mid jacket 3 and the upper jacket 4.

Figure 8:
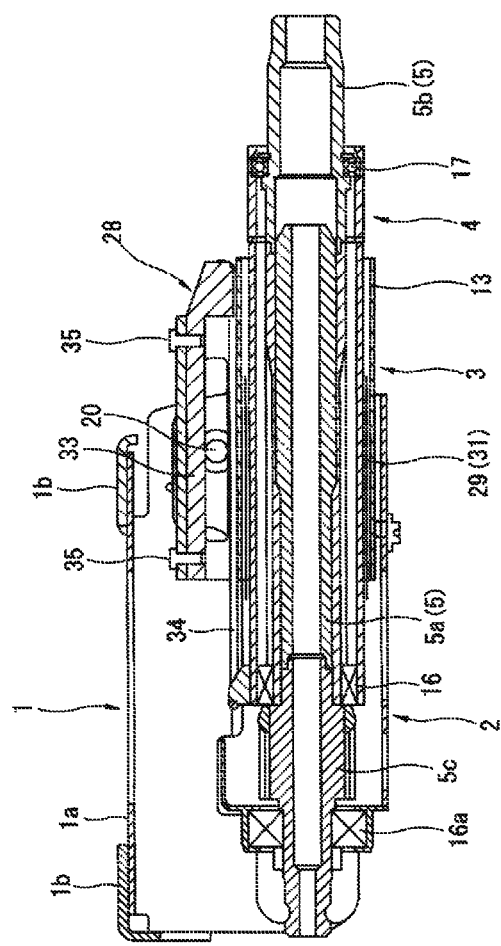
FIG. 8 is a longitudinal sectional view taken along the longitudinal direction of the steering column device after absorbing shock energy.

In addition, FIG. 8 shows a state in which the contracting operation (sliding operation) between the jacket body 13 of the mid jacket 3 and the upper jacket 4 has been performed with a predetermined stroke when absorbing the shock energy at the time of the secondary collision.

Here, it is possible to adjust the shock energy absorbing performance at the time of the secondary collision by changing the diameter of the wire 34, the groove width and depth of the wire guide groove 33b, and the curvature of the wire guide groove 33b at the back end portion of the resistance block 33 sliding to the wire 34 when the wire 34 of the resistance block 33 is pulled out.

In this way, according to the present embodiment, the energy absorbing part 28 and the contracting guide part 27 in the shock energy absorbing mechanism 26 are functionally and structurally separated, and the contracting guide part 27 is one in which the plurality of the linear guides 29, as the linear motion guide member, in which the balls 29b as the rolling element are supported by the holder 29a are interposed at the overlapping part between the mid jacket 3 and the upper jacket 4. The shock energy absorption can therefore be performed by smoothly sliding and contracting the upper jacket 4 to the mid jacket 3 even in a case where the wrench occurs at the time of the secondary collision, and the shock energy absorbing performance thus becomes stable regardless of the difference of the condition at the time of the vehicle collision and the difference of the mounting angle of the steering column to the vehicle.

Furthermore, since the contracting guide part 27 is independent from the energy absorbing part 28, the sliding stroke of the upper jacket 4 to the mid jacket 3 can be set independently without considering the energy absorbing performance at the energy absorbing part 28, and the size of the steering column device can be reduced by shortening the sliding stroke. Moreover, the rolling bearing function of the linear guide 29 as the linear motion guide member is exhibited at the contracting guide part 27, the shock energy absorbing performance therefore becomes further stable.

Here, effects brought about through the present embodiment other than the above are listed below.

(a) In the overlapping part between the polygonal cylindrical jacket body 13 of the mid jacket 3 and the polygonal cylindrical upper jacket 4, when the polygonal sections of the jacket body 13 and the upper jacket 4 are the quadrangles, the linear guide 29, as the linear motion guide member, is interposed between each of the corner parts (four corner parts) of the quadrangular jacket body 13 and each the corner parts (four corner parts) of the quadrangular upper jacket 4, and when the polygonal sections of the jacket body 13 and the upper jacket 4 are the deformed octagons, the linear guide 29 is disposed between each of the parts corresponding to the short side parts of the octagonal jacket body 13 and each of the parts corresponding to the short side parts of the octagonal upper jacket 4 of FIG. 7. With this, even if the wrench occurs at the time of the secondary collision as mentioned above, there is an advantage that the relative sliding operation of the upper jacket 4 to the mid jacket 3 is extremely stably performed.

(b) Since the plurality of the holders 29a, 29a of the linear guides as the linear motion guide member are connected to each other through the stays 30 positioned so as not to interfere with the shear pin 19 as a pin member, the handling of the linear guides 29 becomes easy as compared with a case where the plurality of the linear guides 29 are separated and independent from each other. Furthermore, the shear pin 19 needs to be sheared to perform the relative sliding operation of the upper jacket 4 to the mid jacket 3 at the time of the collision, the stays 30, however, do not become an obstacle when the shear pin 19 is sheared.

(c) Since the guide grooves 32a and 32b on which the bolls 29b as the rolling element of the linear guide 29 roll are respectively formed on the jacket body 13 of the mid jacket 3 and the upper jacket 4, the guide effect of the linear guide 29 becomes further remarkable, and the relative sliding operation between the mid jacket 3 and the upper jacket 4 is further stably performed.

(d) Since the energy absorbing part 28 of the shock energy absorbing mechanism 26 is provided in the space between the jacket body 13 of the mid jacket 3 and the distance bracket 14, the energy absorbing part 28 and the contracting guide part 27 which are functionally positionally independent from each other can be positioned so as to overlap with each other in the axial direction of each of the jackets 3 and 4. With this, the size of the steering column device can also be reduced, and in particular, the total length of the steering column device can be shortened.

Figure 9:
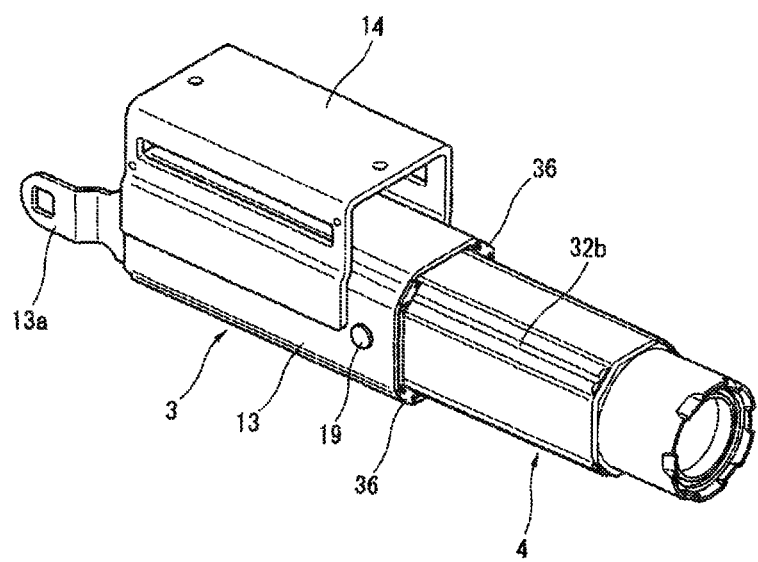
FIG. 9 is a drawing showing a perspective views of a mid jacket and an upper jacket, showing a second embodiment of the steering column device according to the present invention.
Figure 10:
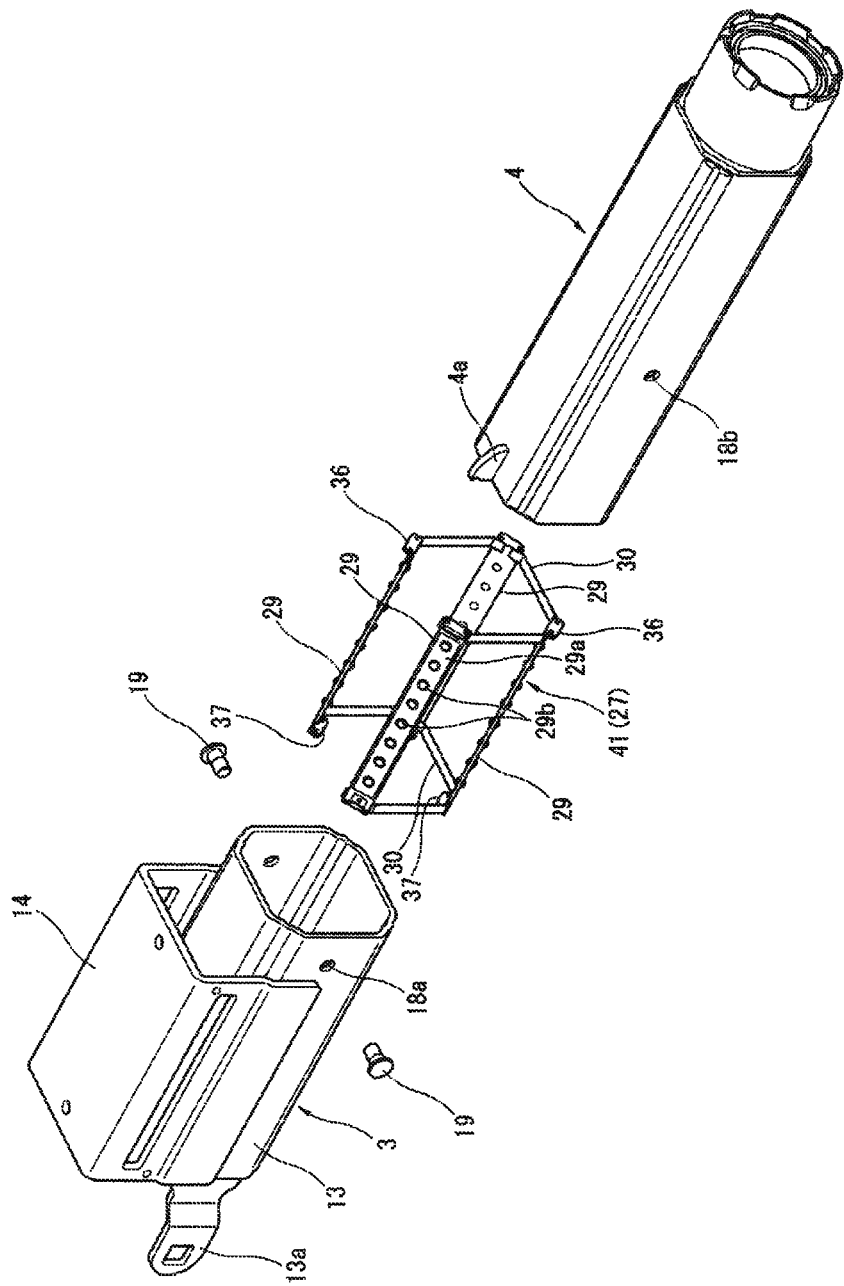
FIG. 10 is a perspective exploded view of a constituent element in FIG. 9.
Figure 11A:
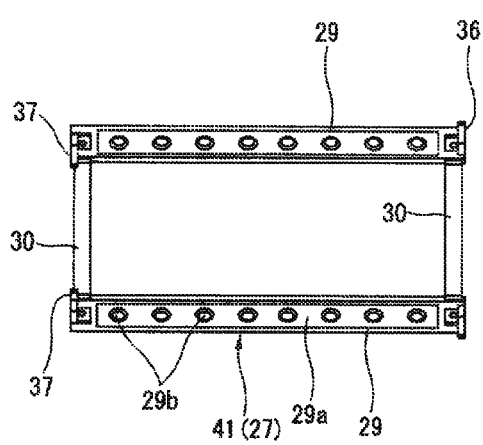
FIG. 11(A) and FIG. 11(B) are drawings showing a detail of a linear guide unit shown in the drawings.
Figure 11B:
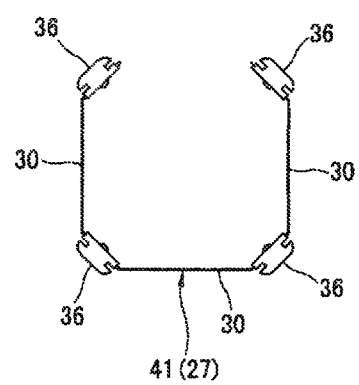

FIG. 9 to FIG. 11 show a second embodiment of the steering column device according to the present invention. The same element or component as that of FIG. 6, etc. explained above is denoted by the same reference sign.

In the second embodiment, as is clear when FIG. 10 and FIG. 6 are compared, the configuration of a linear guide unit 41 which is unitized by connecting the plurality of the linear guides 29 as the linear motion guide member to each other with the stays 30 is different from that of the linear guide unit 31 of FIG. 6.

More specifically, as shown in FIG. 9 and FIG. 10, the linear guide unit 41 is unitized by connecting the front end portions and the back end portions of the four linear guides 29 to each other through the thin plate-shaped stays 30 as the connecting member. In addition, as also shown in FIG. 11, a locking projection 36 projecting outside is formed at each of the back ends of the holders 29a of the linear guides 29, and a locking projection 37 projecting inside is formed at each of the front ends of the holders 29a of the linear guides 29. Moreover, in a normal assembled state in which the linear guide unit 41 has been interposed at the overlapping part between the jacket body 13 of the mid jacket 3 and the upper jacket 4, as shown in FIG. 9, the locking projection 36 of each of the back ends of the linear guides 29 is locked to the back end surface of the jacket body 13, and the locking projection 37 of each of the front ends of the linear guides 29 is locked to the front end surface of the upper jacket 4.

When the relative sliding operation of the upper jacket 4 to the jacket body 13 of the mid jacket 3 is performed, the locking projection 36 of each of at least the back ends of the linear guides 29 can be relatively easily separated from each of the holders 29a of the linear guides 29 by being broken or sheared.

According to the configuration, the linear guide unit 41 which is the assembly of the four linear guides 29 is positioned to each of the jacket body 13 and the upper jacket 4, and assembling workability at the time when the steering column is assembled is therefore improved, and the position of the linear guide unit 41 is not shifted. In addition, when the upper jacket 4 relatively slides to the jacket body 13 of the mid jacket 3 at the time of the above-mentioned secondary collision, the blocking projections 36 of at least the back side of the linear guide unit 41 is separated from the holders 29a of the linear guides 29 by being broken or sheared.

In addition, even if the locking projection 37 of each of the front sides of the linear guides 29 of the locking projections 36 and 37 respectively provided at the back and the front sides of the linear guides 29 is omitted, the expected purpose can be achieved.

In the second embodiment, the same effect as that of the first embodiment can also be obtained.

Here, in the first and the second embodiments, although the cylindrical quadrangular or the cylindrical deformed octagonal jacket body 13 of the mid jacket 3 and upper jacket 4 are used, as long as both of their shapes are polygons similar to each other, the jacket body 13 and the upper jacket 4 having, for example, regular hexagons, regular octagons or cylindrical deformed polygons can be used.

In addition, although one in which the resistance block 33 as a resistance member and the wire 34 are combined is used as the energy absorbing part 28 of the shock energy absorbing mechanism 26, the specific configuration of the energy absorbing part 28 is not limited to this type. For example, other types such as a rupture type and a press-fitting type can be used, if a type of the energy absorbing part 28 is functionally and structurally independent from the contracting guide part 27 and can be exhibited the same function as that of the above energy absorbing part 28.

Moreover, a type and a number of the linear guide 29 as the linear motion guide member is also not limited to one shown in FIG. 6 and FIG. 10. For example, in addition to a type of the linear guide 29 in which the boll 29b as the rolling element is used, a type of the linear guide 29 in which, for example, a needle or a roller is used can be used. Furthermore, the interposing position of the linear guide 29 is also not necessarily limited to the position shown in FIG. 7 even in a position where the relative sliding operation of the upper jacket 4 to the jacket body 13 of the mid jacket 3 can be smoothly performed.

The entire contents of Japanese Patent Application No. 2015-208496 filed on Oct. 23, 2015 are incorporated herein by reference.

The invention claimed is:

1. A steering column device comprising:
    a downward U-shaped attachment bracket fixed to a vehicle;
    an upward U-shaped lower jacket disposed inside a U-shaped space of the attachment bracket and supported by the attachment bracket;
    a polygonal cylindrical mid jacket disposed inside a U-shaped space of the lower jacket and supported by the lower jacket;
    a polygonal cylindrical upper jacket, of which a shape is similar to that of the mid jacket, inserted into and supported by the mid jacket so as to be able to slide; and
    a shock energy absorbing mechanism for absorbing a shock energy at a time of a secondary collision,
    wherein the shock energy absorbing mechanism has a contracting guide part to smoothly perform a sliding and contracting operation of the upper jacket to the mid jacket at the time of the secondary collision separately from an energy absorbing part serving as a load generation part to absorb the shock energy,
    wherein the contracting guide part is formed by interposing a linear motion guide member at an overlapping part between the mid jacket and the upper jacket, linear motion guide member in which at least two rolling elements arranged in a sliding direction of the mid jacket and the upper jacket are supported by a holder, and
    wherein a relative position between the mid jacket and the upper jacket is regulated except for at a time of collision by a pin member which is sheared at the time of the collision.

2. The steering column device according to claim 1, wherein, in the overlapping part between the polygonal cylindrical mid jacket and the polygonal cylindrical upper jacket, the linear motion guide member is interposed between each corner part of the polygonal cylindrical mid jacket and each corner part of the polygonal cylindrical upper jacket.

3. The steering column device according to claim 2, wherein holders of a plurality of linear motion guide members are connected to each other through connecting members disposed so as not to interfere with the pin member even when the upper jacket slides to the mid jacket.

4. The steering column device according to claim 3, wherein at least a back end portion of each of the linear motion guide members is locked to a back end portion of the mid jacket, and a position of each of the linear motion guide members to the mid jacket is positioned.

5. The steering column device according to claim 4, wherein the mid jacket and the upper jacket are each provided with a guide groove on which the rolling elements of the linear motion guide member roll.

6. The steering column device according to claim 1, wherein the mid jacket has a polygonal cylindrical jacket body and a downward U-shaped distance bracket fixed to an upper part of the jacket body, and
    wherein the energy absorbing part of the shock energy absorbing mechanism is provided inside a U-shaped space of the distance bracket.

* * * * *